(12) United States Patent
Murakami et al.

(10) Patent No.: US 8,317,943 B2
(45) Date of Patent: Nov. 27, 2012

(54) BALL FOR CONSTANT VELOCITY JOINT AND METHOD FOR PRODUCING THE SAME

(75) Inventors: Takafumi Murakami, Tochigi-ken (JP); Naoto Shibata, Utsunomiya (JP); Shunta Osako, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 12/996,665

(22) PCT Filed: May 22, 2009

(86) PCT No.: PCT/JP2009/059404
§ 371 (c)(1),
(2), (4) Date: Dec. 7, 2010

(87) PCT Pub. No.: WO2009/150928
PCT Pub. Date: Dec. 17, 2009

(65) Prior Publication Data
US 2011/0162765 A1 Jul. 7, 2011

(30) Foreign Application Priority Data
Jun. 9, 2008 (JP) ................................. 2008-150856

(51) Int. Cl.
*C22C 38/36* (2006.01)
*C21D 9/36* (2006.01)
(52) U.S. Cl. ........ 148/325; 148/321; 148/326; 148/327; 148/328; 148/906; 148/663; 384/625; 384/912; 72/53; 29/90.7
(58) Field of Classification Search .................. 148/906, 148/663, 325, 326, 327, 328, 321; 384/625, 384/912; 72/53; 29/90.7
See application file for complete search history.

(56) References Cited

U.S. PATENT DOCUMENTS

| 5,147,140 A | * | 9/1992 | Murakami et al. | ............ 384/492 |
| 6,478,893 B1 | * | 11/2002 | Takemura | ..................... 148/320 |
| 6,579,384 B2 | | 6/2003 | Usui et al. | |

(Continued)

FOREIGN PATENT DOCUMENTS

EP  1452610 A1 * 9/2004

(Continued)

OTHER PUBLICATIONS

Machine-English translation of Japanese patent 05-195070, Goto Masao et al., Aug. 3, 1993.*

(Continued)

*Primary Examiner* — Deborah Yee
(74) *Attorney, Agent, or Firm* — Squire Sanders (US) LLP

(57) ABSTRACT

Disclosed is a ball for a constant velocity joint, and a method for producing the same. The ball for a constant velocity joint is produced via a quenching step for heating a spherical body consisting of a material corresponding to a high carbon chromium bearing steel regulated by Japanese Industrial Standards (JIS) to 840-900° C. and then cooling the spherical body under such a condition as 10-25 vol. % of austenite remains up to a first part where the depth from the surface is 0.1 mm, a step for tempering the spherical body at 150° C. or more, and a step for shot peening the spherical body and imparting a compression residual stress of −1000 MPa or more to a region reaching second part where the depth from the surface is 0.2 mm.

7 Claims, 5 Drawing Sheets

U.S. PATENT DOCUMENTS

2007/0151634 A1    7/2007  Fujita

FOREIGN PATENT DOCUMENTS

| | | | |
|---|---|---|---|
| JP | 61-270331 | | 11/1986 |
| JP | 2-168022 | | 6/1990 |
| JP | 05-195070 | * | 8/1993 |
| JP | 5-215144 | | 8/1993 |
| JP | 11-019828 | | 1/1999 |
| JP | 2000-145804 | | 5/2000 |
| JP | 2001-056031 A | | 2/2001 |
| JP | 2002-122145 | | 4/2002 |
| JP | 2005-314794 | | 11/2005 |
| JP | 2006-275171 | | 10/2006 |
| JP | 2007-182607 | | 7/2007 |

OTHER PUBLICATIONS

Japanese Office Action application No. 2008-150856 dated Dec. 20, 2011.

* cited by examiner

BALL FOR CONSTANT VELOCITY JOINT AND METHOD FOR PRODUCING THE SAME

TECHNICAL FIELD

The present invention relates to a ball for use in a constant-velocity joint disposed between an outer race member and an inner race member of a constant-velocity joint, and a method of manufacturing the same.

BACKGROUND ART

An automobile body is equipped with a driving force transmission mechanism having a plurality of rotation shafts and a constant-velocity joint disposed therebetween to transmit a driving force from an engine such as an internal-combustion engine to tires. For example, a drive shaft and a hub are displaceably connected with each other through a Birfield constant-velocity joint, which has an outer race member, an inner race member, and a ball for use in a constant-velocity joint (which may be referred to as a rolling ball) disposed between the races.

Recently, for the purpose of improving the specific fuel consumption of the automobile, weight reduction of a body of the automobile and also various components of the automobile has been studied. In view of the purpose, also the Birfield constant-velocity joint is required to be further lightened (i.e., downsized).

However, small members are generally poor in rigidity. Thus, size reduction of the outer race member, the rolling ball, or the like in the Birfield constant-velocity joint results in lowered durability. In view of solving the problem, in a method proposed in Japanese Laid-Open Patent Publication No. 2000-145804, the surface roughnesses of ball grooves in the outer and inner race members are controlled at 10 to 30 μm, and a lubricant film is formed after a chemical conversion treatment.

In terms of effectively increasing the life of the rolling ball, in a method disclosed in Japanese Laid-Open Patent Publication No. 2002-122145, the rolling ball is composed of a bearing steel or an equivalent material thereof, and the rolling ball is subjected to a nitriding treatment for increasing the surface residual austenite content, and then subjected to a treatment for increasing the crushing load resistance.

In the conventional method described in Japanese Laid-Open Patent Publication No. 2002-122145, when the rolling ball is subjected only to the nitriding treatment, the resultant rolling ball is poor in the crushing load resistance and is easily cracked actually. The crushing load resistance-increasing treatment is carried out for this reason (see, Paragraph 0005). In Japanese Laid-Open Patent Publication No. 2002-122145, a tempering treatment in the temperature range of 180° C. to 230° C. is described as a specific example of the crushing load resistance-increasing treatment. In this example, though the rolling ball is made brittle due to the hardness increase in the nitriding treatment, the surface hardness is lowered to an HRC (Rockwell C-scale hardness) of 60 to 64 in the tempering treatment in the above temperature range.

As a result of intense research, the inventors have found that the surface of the rolling ball is often peeled off in the methods described in Japanese Laid-Open Patent Publication Nos. 2000-145804 and 2002-122145. In other words, it is difficult to maintain sufficient durability of the rolling ball in the conventional methods described in Japanese Laid-Open Patent Publication Nos. 2000-145804 and 2002-122145.

The surface hardness of the rolling ball is lowered in the conventional method described in Japanese Laid-Open Patent Publication No. 2002-122145. However, the rolling ball is required to be abrasion-resistant, whereby it is generally preferred that the rolling ball has a higher surface hardness. As the surface hardness is increased, the abrasion resistance of the rolling ball is improved.

SUMMARY OF INVENTION

When a constant-velocity joint ball composed of an inexpensive steel material such as SUJ2 is downsized, the ball is likely to have a defect such as crack. In the course of researching the cause for the defect, the inventors have found that a white texture, which exhibits a white color in use of a nital etchant, is generated in the metal structure of a portion having the defect. The white texture is generated due to reduction in the carbon content of the steel material. Thus, the inventors have presumed that the defect is caused because the carbon content of the metal structure (the steel material) is reduced, resulting in deterioration of the strength and toughness.

When a rotation shaft connected to a constant-velocity joint is rotated, the ball for the constant-velocity joint is slidably in contact with a ball groove of an outer or inner race member. In other words, relative rolling and sliding are performed between the rolling ball and the outer or inner race member, whereby a shear stress and a frictional heat are generated. The inventors have presumed that the carbon content is reduced due to such generation of the shear stress and frictional heat.

It is expected that the reduction can be prevented by increasing the compressive residual stress of a ball for a constant-velocity joint. In this case, when the shear stress is generated due to the above rolling and sliding, the shear stress is absorbed by the compressive residual stress. However, for example, even in a case where the ball for a constant-velocity joint has a high surface compressive residual stress of −1000 MPa, it is difficult to prevent the defect.

In the course of intensely researching the reason therefor, the inventors have found that the defect is caused particularly in the region within a depth range of 0.1 to 0.2 mm from the surface in the ball for a constant-velocity joint. Based on this finding, the inventors have concluded that not the surface but the internal region has the highest shear stress, as described in the Hertzian stress theory.

When the compressive residual stress of the region within the depth range of 0.1 to 0.2 mm from the surface was controlled at −1000 MPa or higher, the ball for a constant-velocity joint was peeled from the surface. In terms of this behavior, the inventors have found that cracking is caused in the region within a depth range of 0.02 to 0.03 mm from the surface, particularly in the vicinity of a position at a depth of 0.025 mm. Based on this finding, the inventors have presumed that the starting point of the cracking is moved closer to the surface of the ball for the constant-velocity joint due to the increase of the compressive residual stress in the region within the depth range of 0.1 to 0.2 mm from the surface. As a result of further intense research in view of the presumption, the present invention has been accomplished.

A principal object of the present invention is to provide a ball for use in a constant-velocity joint, excellent in durability and abrasion resistance though composed of an inexpensive material.

Another object of the present invention is to provide a method capable of manufacturing the above-mentioned ball for use in a constant-velocity joint.

According to an aspect of the present invention, there is provided a ball for use in a constant-velocity joint having a first position at a depth of 0.1 mm from a surface and a second position at a depth of 0.2 mm from the surface, the ball being disposed between an outer race member and an inner race member of a constant-velocity joint to transmit rotational power in a direction from the outer race member to the inner race member or a reverse direction thereof, wherein the ball is formed using an equivalent material of a high-carbon chromium bearing steel according to Japanese Industrial Standards as a raw steel, a region between the first position and the second position has a compressive residual stress of −1000 MPa or higher, and a region between the surface and the first position has a metal structure with an austenite content of 10% to 25% by volume.

In the present invention, the term "the compressive residual stress is −1000 MPa or higher" means that the compressive residual stress is a negative number having an absolute value larger than that of −1000 MPa. Thus, for example, a compressive residual stress of −1200 MPa is higher than −1000 MPa, and a compressive residual stress of −950 MPa is lower than −1000 MPa.

The high-carbon chromium bearing steel is a steel material having a composition equal to any one of SUJ1 to SUJ5 according to Japanese Industrial Standards (JIS) G 4805.

As described above, it is presumed that, in the ball for a constant-velocity joint, the region within the depth range of 0.1 to 0.2 mm from the surface exhibits the largest carbon content reduction in the metal structure, and thus the highest shear stress. Therefore, the compressive residual stress in the position at the depth of 0.2 mm from the surface is increased to −1000 MPa or higher. Thus, when a shear stress is generated in the ball for the constant-velocity joint due to relative rolling and sliding between the ball and the outer or inner race member, the shear stress can be effectively absorbed by the compressive residual stress, whereby the carbon content reduction can be prevented.

As is clear from this, the carbon content reduction and thus the defect caused due to strength or toughness reduction can be prevented by increasing the compressive residual stress in the position at the particular depth. Thus, an inexpensive steel material can be used for the ball for the constant-velocity joint, so that the ball for the constant-velocity joint can be manufactured with excellent durability and low cost.

Meanwhile, the austenite content of the metal structure in the region between the surface and the first position (at the depth of 0.1 mm from the surface) is controlled at 10% to 25% by volume. The austenite is a soft deposit as compared with pearlite and martensite, and thereby can increase the toughness of the region between the surface and the first position. As a result, cracking in the vicinity of the surface, which causes peeling off, can be prevented. Thus, the peeling can be prevented, and the resultant rolling ball can have a sufficient durability.

In addition, by controlling the austenite content of the metal structure at 10% to 25% by volume, thereby increasing the toughness, the peeling can be prevented even when the rolling ball has a high surface hardness. For example, the surface hardness of the rolling ball may be an HRC of 62 to 68.

Thus a sufficient abrasion resistance can be maintained.

In common rolling balls, such cracking tends to be caused in the region between the surface and the first position. Therefore, it is preferred that the compressive residual stress in the position at the depth of 0.1 mm from the surface is higher than that in the position at the depth of 0.2 mm from the surface. By increasing the compressive residual stress in the position closer to the surface in such a manner, the cracking can be prevented in the vicinity of the surface. For example, the compressive residual stress in the position at the depth of 0.1 mm from the surface may be −1150 MPa or higher.

According to another aspect of the present invention, there is provided a method of manufacturing a ball for use in a constant-velocity joint having a first position at a depth of 0.1 mm from a surface and a second position at a depth of 0.2 mm from the surface, the ball being disposed between an outer race member and an inner race member of a constant-velocity joint to transmit rotational power in a direction from the outer race member to the inner race member or a reverse direction thereof, comprising:

a hardening step of heating a spherical body comprising an equivalent material of a high-carbon chromium bearing steel according to Japanese Industrial Standards at 840° C. to 900° C., followed by cooling the spherical body such that a region between the surface and the first position has an austenite content of 10% to 25% by volume;

a tempering step of tempering the hardened spherical body at 150° C. or higher; and a shot peening step of subjecting the tempered spherical body to a shot peening treatment such that a region between the first position and the second position has a compressive residual stress of −1000 MPa or higher.

By carrying out the steps, the ball for a constant-velocity joint excellent in durability, in which defects are hardly generated from the surface to the inside, can be obtained.

As described above, in the ball for a constant-velocity joint, the region within the depth range of 0.1 to 0.2 mm from the surface is likely to have the white texture which may cause a defect. In the present invention, the compressive residual stress in this region is increased, whereby a shear stress generated in the region due to relative rolling and sliding between the ball for the constant-velocity joint and the outer or inner race member can be absorbed by the compressive residual stress. Furthermore, the austenite content of the metal structure in the region between the surface and the position at the depth of 0.1 mm is controlled at 10% to 25% by volume, whereby the toughness is improved. As a result, the generation of the internal white texture and the peeling in the vicinity of the surface can be prevented, and the defect is hardly caused even in the case of using the inexpensive steel material. In other words, by increasing the compressive residual stress in the region within the depth range of 0.1 to 0.2 mm from the surface to −1000 MPa or higher, and by increasing the austenite content of the metal structure in the vicinity of the surface, the resultant constant-velocity joint ball can be excellent in durability even in the case of using the inexpensive equivalent material of the high-carbon chromium bearing steel.

Preferred examples of the high-carbon chromium bearing steel equivalent materials include SUJ2 equivalent materials. The SUJ2 equivalent materials are inexpensive, and advantageous from the viewpoint of cost.

The above and other objects, features, and advantages of the present invention will become more apparent from the following description when taken in conjunction with the accompanying drawings in which a preferred embodiment of the present invention is shown by way of illustrative example.

DESCRIPTION OF EMBODIMENTS

A preferred embodiment of a ball for use in a constant-velocity joint and a method of manufacturing the same according to the present invention will be described in detail below with reference to accompanying drawings.

Figure 1:
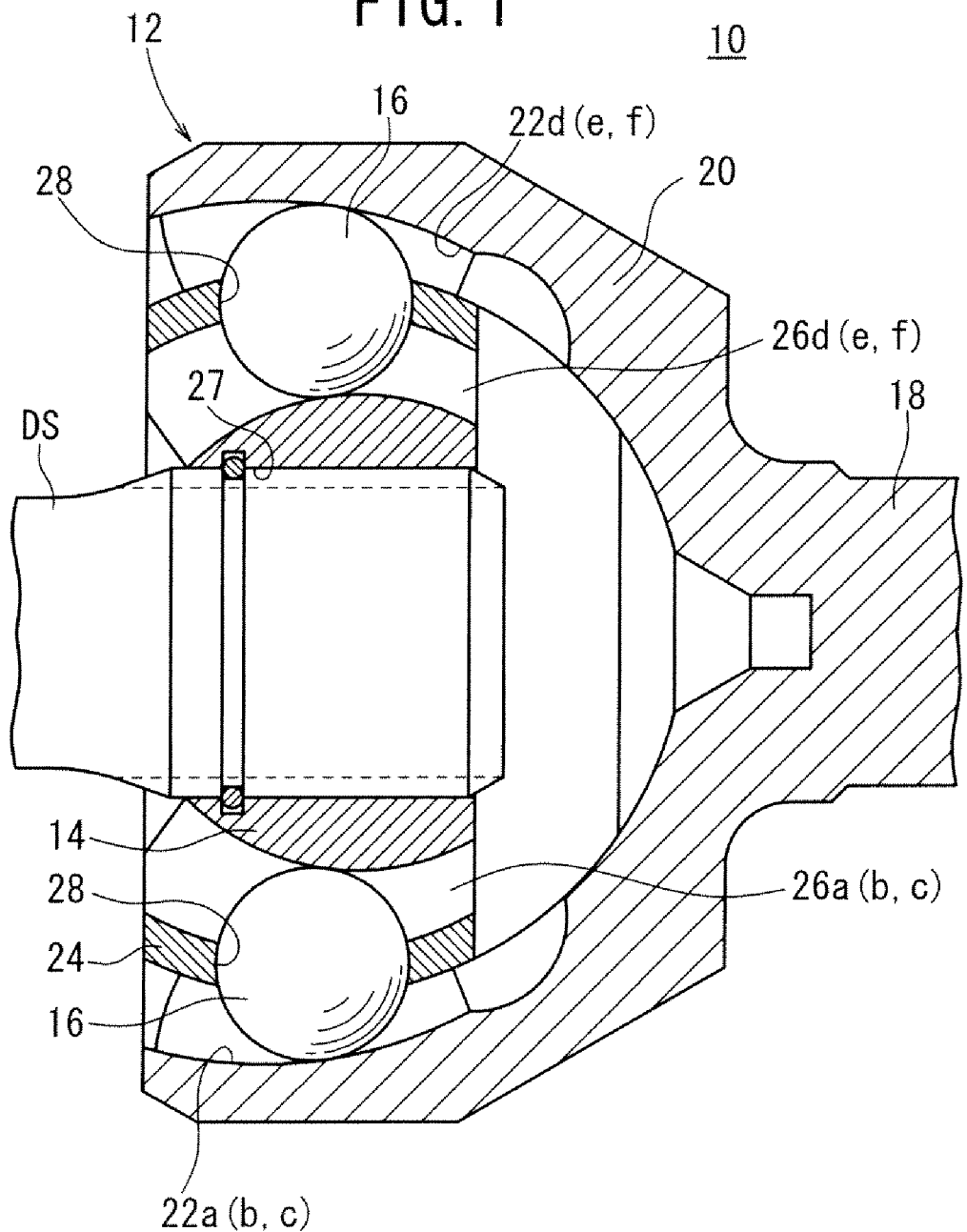
FIG. 1 is a schematic cross-sectional view of a Birfield constant-velocity joint equipped with balls for a constant-velocity joint (rolling balls) according to an embodiment of the present invention.

FIG. 1 is a schematic cross-sectional view showing a Birfield constant-velocity joint (which may be referred to as a constant-velocity joint) 10. The constant-velocity joint 10 has an outer race member 12 and an inner race member 14, and rolling balls 16 (balls for use in a constant-velocity joint) according to this embodiment are disposed between the outer race member 12 and the inner race member 14.

The outer race member 12 has a shaft portion 18 and an opening cylindrical portion 20, and six ball grooves 22a to 22f are formed equiangularly on the curved inner wall of the cylindrical portion 20.

The inner race member 14 is inserted in the cylindrical portion 20 and supported by a retainer 24, and inner ball grooves 26a to 26f are formed on the inner race member 14. The inner ball grooves 26a to 26f extend outwardly in the diametrical direction such that the curved outer wall is cut away, and the number of the inner ball grooves 26a to 26f is equal to that of the ball grooves 22a to 22f on the outer race member 12. Further, a through-hole 27 is formed from one end to the other end of the inner race member 14, and a drive shaft DS is fitted into the through-hole 27.

In the retainer 24, windows 28 passing from the inner wall to the outer wall are formed. The rolling balls 16 are contained in the windows 28, and inserted into the ball grooves 22a to 22f on the outer race member 12 and the inner ball grooves 26a to 26f on the inner race member 14.

Figure 2:
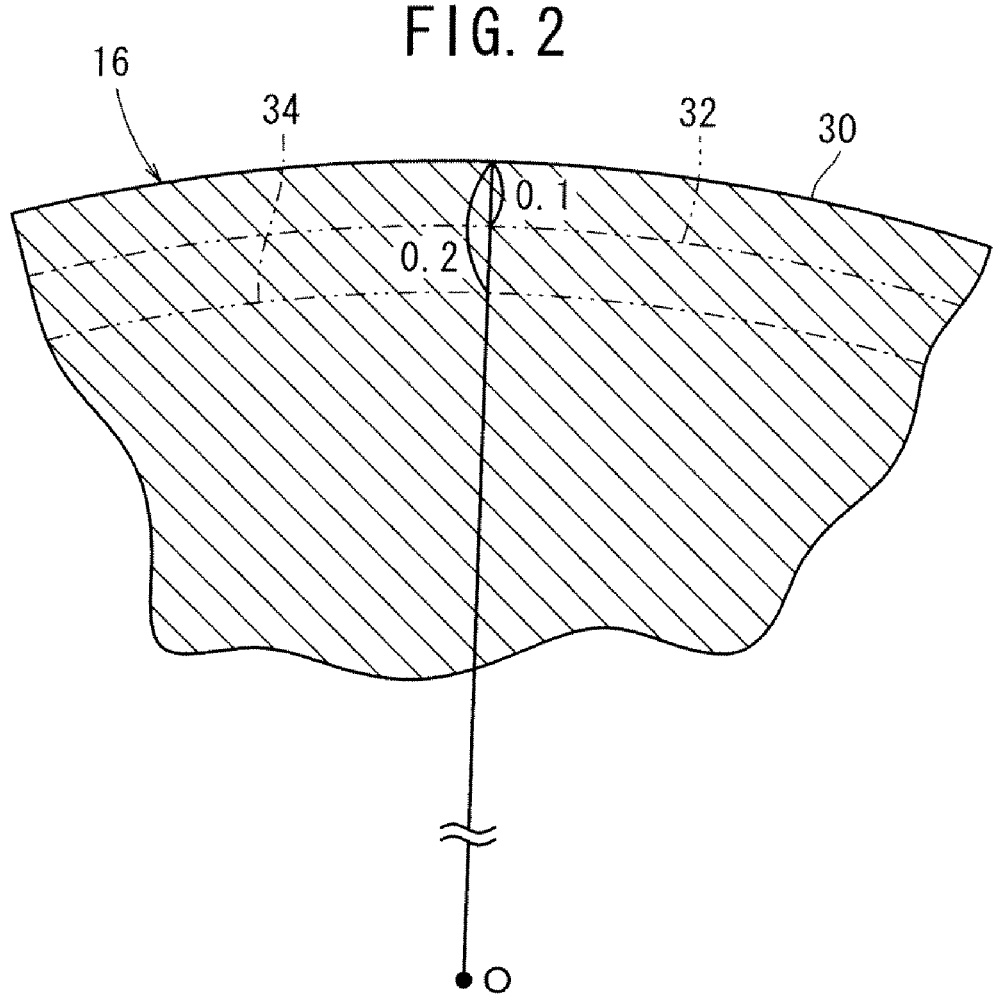
FIG. 2 is an enlarged cross-sectional view of a principal part of the rolling ball of FIG. 1.

An enlarged cross section of a portion in the vicinity of the surface of the rolling ball 16 is shown in FIG. 2. As shown in FIG. 2, the rolling ball 16 has a surface 30, a first position 32 at a depth of 0.1 mm from the surface 30, and a second position 34 at a depth of 0.2 mm from the surface 30. Further, the rolling ball 16 has a center O.

Figure 3:
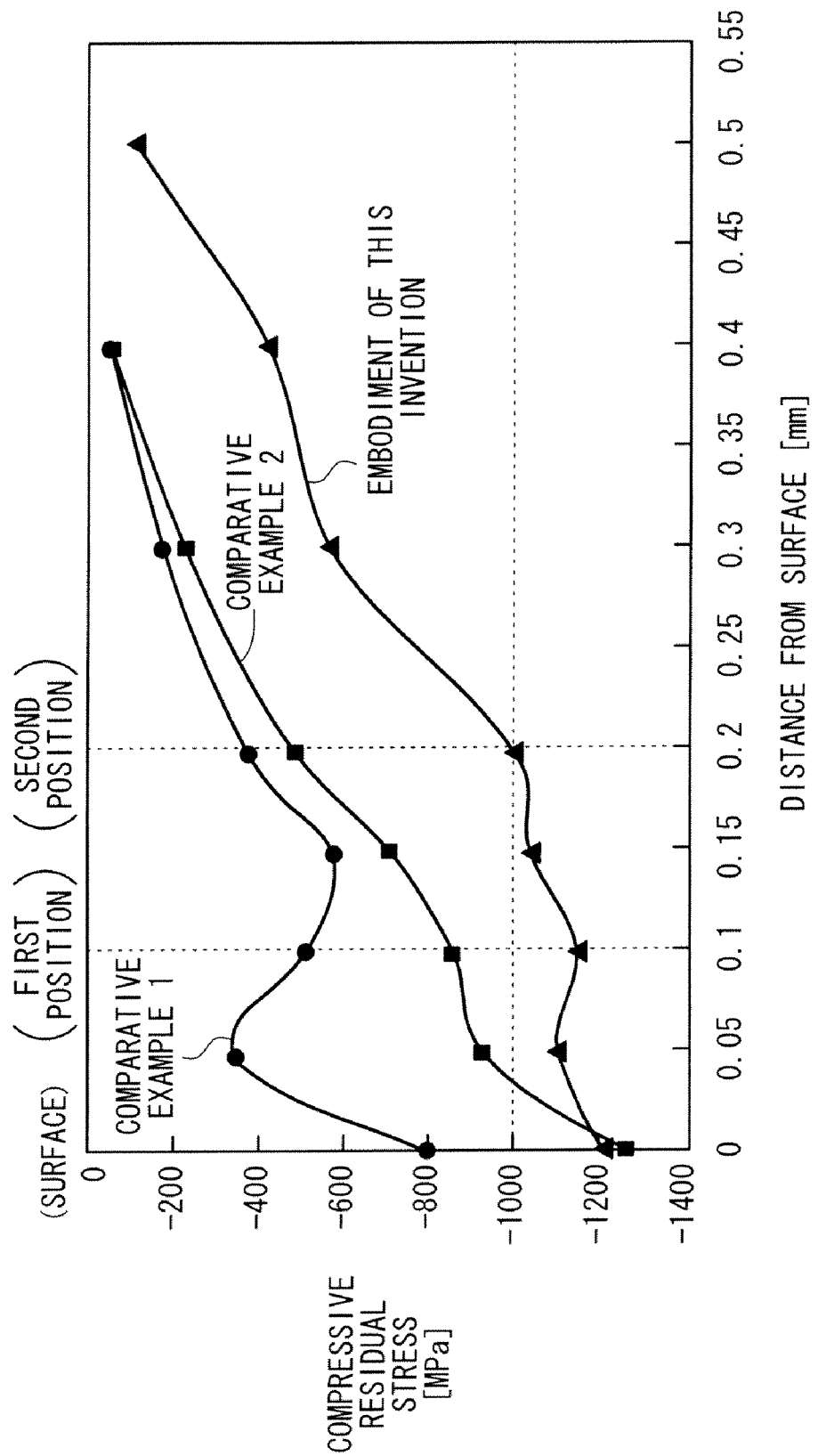
FIG. 3 is a graph showing the relation between a depth from a surface and a compressive residual stress in each of the rolling balls according to the embodiment and Comparative Examples 1 and 2.

FIG. 3 is a graph showing the relation between the depth from the surface 30 and a compressive residual stress in the rolling ball 16 having a diameter of 19/32 inch. In the rolling ball 16 according to this embodiment, the compressive residual stresses in the surface 30, the first position 32, and the second position 34 are −1000 MPa or higher, i.e., −1200 MPa, −1180 MPa, and −1020 MPa, respectively. As is clear from FIG. 3, also the region between the first position 32 and the second position 34 has a compressive residual stress of −1000 MPa or higher.

In this case, the rolling ball 16 is formed using SUJ2, one of high-carbon chromium bearing steels, as a raw steel.

The constant-velocity joint 10 containing the rolling balls 16, which has such a structure shown in FIG. 1, is used in a driving force transmission mechanism of an automobile for transmitting a driving force from an engine to tires.

While driving the automobile, when a driver turns a steering wheel to change the direction, or the automobile goes over a very bumpy road, the drive shaft DS is displaced. Thus, in the constant-velocity joint 10, the rolling balls 16 are slidably brought into contact with the ball grooves 22a to 22f of the outer race member 12 and the inner ball grooves 26a to 26f of the inner race member 14. As a result, relative rolling and sliding are performed between the rolling balls 16, the outer race member 12, and the inner race member 14, so that a shear stress and a frictional heat are generated.

A load is applied particularly to the region between the first position 32 and the second position 34 (see FIG. 2) in the rolling ball 16 due to the shear stress and the frictional heat. The carbon content of the metal structure in the region is lowered because of the load.

A so-called white texture, which exhibits a white color under the use of a nital etchant, is generated in the metal structure having the lowered carbon content. The white texture is brittle, and thereby can cause peeling and cracking.

However, in this embodiment, as shown in FIG. 3, the region between the first position 32 and the second position 34 has a compressive residual stress of −1000 MPa or higher. In the region with such a high compressive residual stress, the above-described shear stress is absorbed. Therefore, the textural change to the white texture by the carbon reduction can be prevented in the embodiment.

More specially, in this embodiment, a high compressive residual stress is applied in advance to the second position 34 of the rolling ball 16, and thus the region within the depth range of 0.1 to 0.2 mm from the surface 30 (the region between the first position 32 and the second position 34) has a high compressive residual stress. Thus, in this region, the shear stress can be absorbed and the generation of the white texture can be prevented.

The white texture is hardly generated in a region deeper than the second position 34 naturally. Thus, only by increasing the compressive residual stress of the region between the first position 32 and the second position 34, the generation of the white texture, which may cause peeling and cracking, can be prevented over the entire rolling ball 16.

The generation of the white texture is prevented in this manner, whereby the peeling and cracking can be prevented even in the case of using an inexpensive steel material such as SUJ2 in the rolling ball 16. Thus, the rolling ball 16 can be manufactured with long life and low cost.

Figure 4:
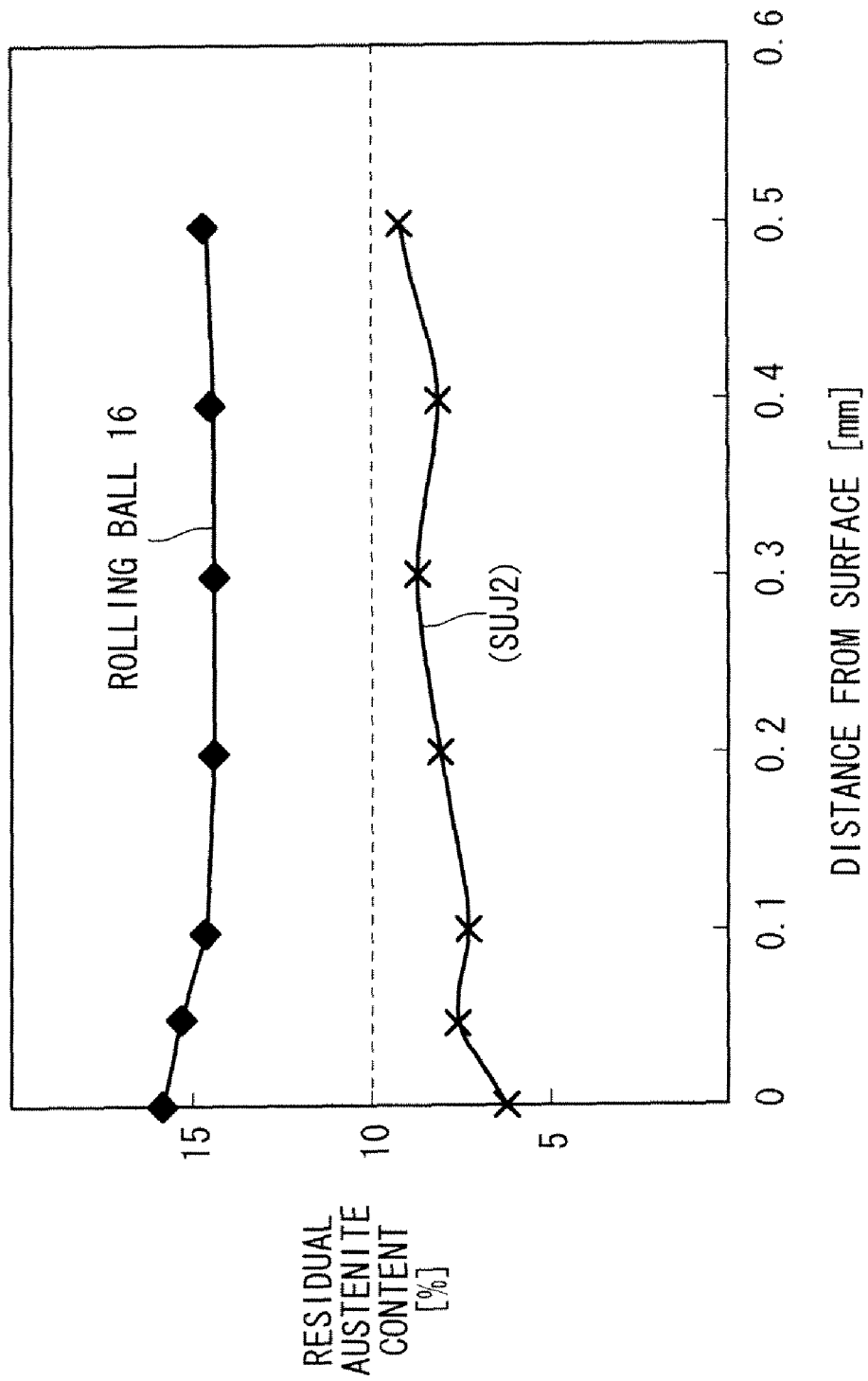
FIG. 4 is a graph showing the austenite content of metal structure in a region between the surface and a position at a depth of 0.5 mm in each of the rolling ball according to the embodiment and an SUJ2 rolling ball.

The austenite content of the metal structure in a region between the surface 30 and a position at a depth of 0.5 mm in the rolling ball 16 is shown in FIG. 4 together with the austenite content in a common SUJ2 rolling ball. As is clear from FIG. 4, the austenite content of the SUJ2 rolling ball is at most approximately 9% by volume. In contrast, the austenite content of the rolling ball 16 according to the embodiment is approximately 16% by volume in the surface 30 and 14.8% by volume in the first position 32. Furthermore, the austenite content is more than 14% by volume over the entire region, even in the position at a depth of 0.5 mm.

Thus, the rolling ball 16 has a higher austenite content of the metal structure in the region between the surface 30 and the first position 32, as compared with the SUJ2 rolling ball. The austenite is softer than pearlite and martensite, whereby the region with the higher austenite content has an increased toughness. As a result, cracking in the vicinity of the surface (i.e., in the region between the surface 30 and the first position 32), which causes peeling off, can be prevented.

Furthermore, the rolling ball 16 has a high toughness of the surface 30, and thus can have a high surface hardness. Specifically, the surface hardness of the rolling ball 16 can be an HRC of 62 to 68. Therefore, the surface 30 can have a sufficient abrasion resistance.

The rolling ball 16 can be manufactured as follows.

First, a spherical body composed of an SUJ2 equivalent material (a raw steel) is subjected to a hardening treatment. The spherical body is heated at 840° C. to 900° C., and then cooled. The cooling is carried out such that the region between the surface 30 and the first position 32 at the depth of 0.1 mm in the spherical body has a residual austenite content of 10% to 25% by volume.

In general, the metal structure of the raw steel contains pearlite. The pearlite is converted to austenite by the above heating. The austenite is generally transformed to martensite in the following cooling. In this embodiment, the cooling rate is lowered to delay the time until the temperature of the spherical body reaches the martensite deposition start temperature (the Ms point). As a result, the amount of the austenite remaining in the metal structure after the cooling can be increased.

The cooling rate may be selected depending on the diameter of the rolling ball 16 practically.

Then, the spherical body is subjected to a tempering treatment at 150° C. or higher. The metal structure formed in the hardening treatment is stabilized by this step.

Next the spherical body is provided with a compressive residual stress. For example, known treatment method and apparatus described in Japanese Laid-Open Patent Publication No. 61-270331 or 11-019828 may be used in this step. Thus, for example, a plurality of the hardened and tempered rolling balls 16 are placed in a barrel, and then the barrel is rotated such that the rolling balls 16 are collided with the inner wall of the barrel or with each other. The collision is repeated to provide the rolling balls 16 with the compressive residual stress.

In the rolling ball 16, the depth, at which the compressive residual stress is maximized, depends on the diameter and the treatment conditions of the rolling ball 16. For example, in a case where the rolling ball 16 having a diameter of ⅜ inch is treated using the apparatus described in Japanese Laid-Open Patent Publication No. 11-019828, and a support shaft having the same axis line as the barrel is rotated at 50 rpm for 90 minutes in the direction opposite to the rotation direction of the barrel, the first position 32 at the depth of 0.1 mm from the surface 30 has the highest compressive residual stress of approximately −960 MPa. In another case where the support shaft is rotated at 65 rpm for 90 minutes, a position at the depth of 0.15 mm from the surface 30 has the highest compressive residual stress of approximately −1000 MPa.

As is clear from this, by increasing the revolution of the support shaft, the maximum compressive residual stress value and the depth with the maximum value of the rolling ball 16 can be controlled. For example, the compressive residual stress values in the first position 32 and the second position 34 of the rolling ball 16 having a diameter of 19/32 inch can be controlled at −1180 MPa and −1020 MPa, respectively, as shown in FIG. 3 by rotating the support shaft at 50 rpm for 2.5 hours.

Also the relation between the depth from surface and the compressive residual stress in each of rolling balls of Comparative Examples 1 and 2 is shown in FIG. 3. The rolling balls are prepared at a low revolution of the support shaft and have the same diameter of 19/32 inch. In Comparative Example 1, the compressive residual stress values in the positions at depths of 0.1 mm and 0.2 mm from the surface are −870 MPa and −500 MPa, respectively. In Comparative Example 2, the compressive residual stress values in the positions at depths of 0.1 mm and 0.2 mm from the surface are −510 MPa and −380 MPa, respectively. Thus, in the rolling balls of Comparative Examples 1 and 2, the compressive residual stress in the region, which is likely to have the white texture, is −1000 MPa or lower.

Figure 5:
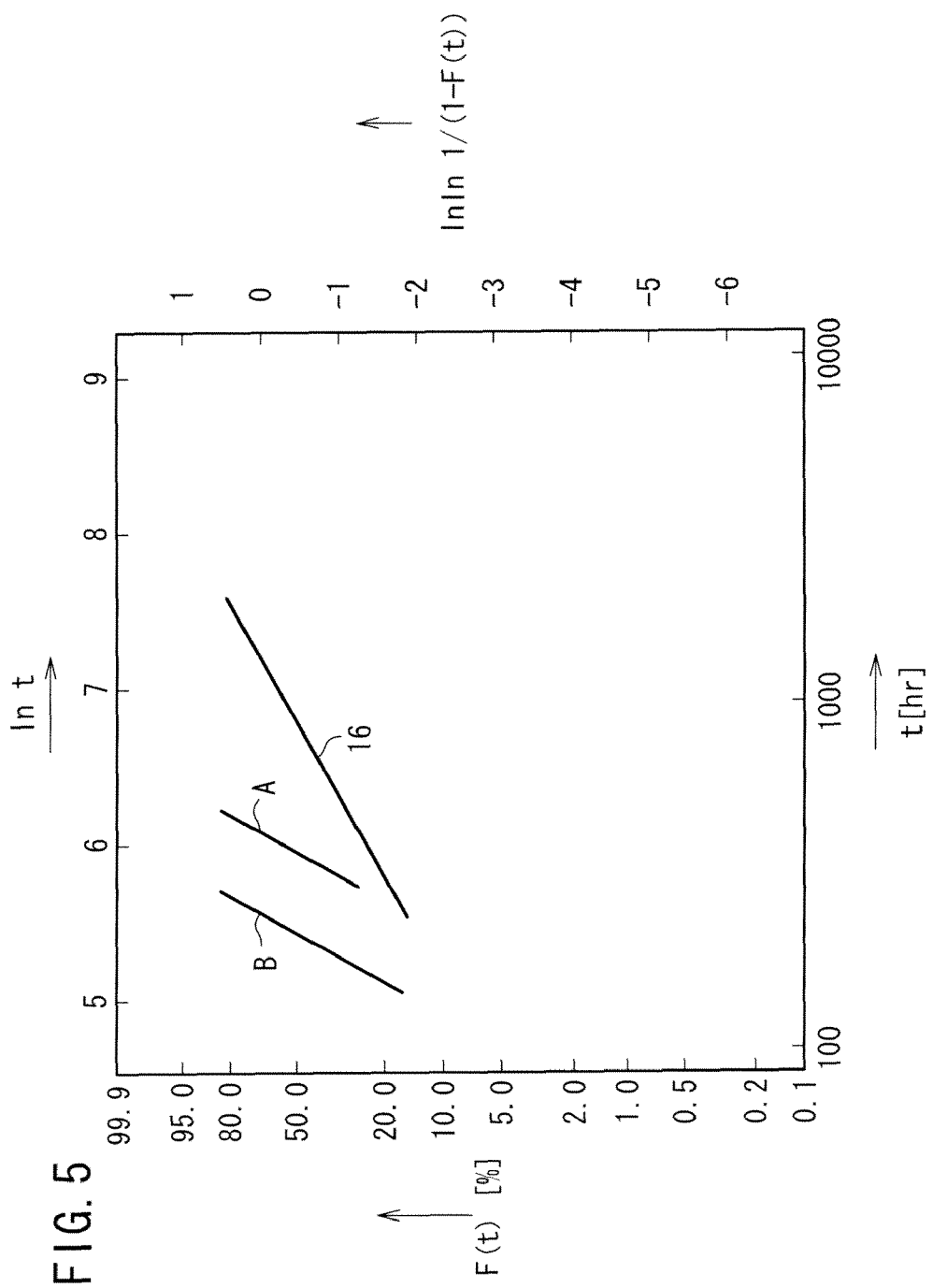
FIG. 5 is a graph showing Weibull probability plots of the rolling ball according to the embodiment, a rolling ball having an austenite content of less than 10% in a region between the surface and the position at a depth of 0.1 mm, and an SUJ2 rolling ball.

Further, it is clear from FIG. 3 that the durability of the rolling ball 16 according to the embodiment is significantly different from that of the rolling ball of Comparative Example 2, in spite of the approximately same surface compressive residual stress values. Thus, the durability of the rolling ball can be improved by increasing the compressive residual stress in the second position 34 to −1000 MPa or higher, thereby increasing the compressive residual stress in the region between the first position 32 and the second position 34, which is likely to have the white texture.

the rolling ball 16 according to this embodiment and rolling balls A and B, the time being shown on the horizontal axis. The rolling ball A has an austenite content of less than 10% in a region between the surface and the position at a depth of 0.1 mm, though the compressive residual stress in the region within the depth range of 0.1 to 0.2 mm from the surface thereof is approximately equal to that of the rolling ball 16. The rolling ball B is composed of SUJ2 steel. It is clear from FIG. 5 that the rolling ball B, the rolling ball A, and the rolling ball 16 have lifetimes increased in this order.

As described above, in this embodiment, the rolling ball 16 excellent in durability can be obtained.

Though the rolling ball 16 formed by using the SUJ2 as the raw steel is described as an example in the above embodiment, the material of the rolling ball 16 is not limited to the SUJ2, and may be any equivalent material of a high-carbon chromium bearing steel. Thus, the material of the rolling ball 16 may be an equivalent material of SUJ1, SUJ3, SUJ4, or SUJ5.

The invention claimed is:

1. A ball for use in a constant-velocity joint having a first position at a depth of 0.1 mm from a surface and a second position at a depth of 0.2 mm from the surface, the ball being disposed between an outer race member and an inner race member of a constant-velocity joint to transmit rotational power in a direction from the outer race member to the inner race member or a reverse direction thereof,
    wherein the ball is formed using a high-carbon chromium bearing steel according to Japanese Industrial Standards as a raw steel,
    an entire region between the first position and the second position has a compressive residual stress of −1000 MPa or higher, and
    a region between the surface and the first position has a metal structure with an austenite content of 10% to 25% by volume.

2. The ball for use in a constant-velocity joint according to claim 1, wherein the compressive residual stress in the first position is −1150 MPa or higher.

3. The ball for use in a constant-velocity joint according to claim 1, wherein the compressive residual stress in the first position is higher than that in the second position.

4. The ball for use in a constant-velocity joint according to claim 1, wherein the high-carbon chromium bearing steel comprises SUJ2 according to Japanese Industrial Standards.

5. The ball for use in a constant-velocity joint according to claim 1, wherein the surface has a Rockwell C-scale hardness of 62 to 68.

6. A method of manufacturing a ball for use in a constant-velocity joint having a first position at a depth of 0.1 mm from a surface and a second position at a depth of 0.2 mm from the surface, the ball being disposed between an outer race member and an inner race member of a constant-velocity joint to transmit rotational power in a direction from the outer race member to the inner race member or a reverse direction thereof, the method comprising:

a hardening step of heating a spherical body comprising a high-carbon chromium bearing steel according to Japanese Industrial Standards at 840° C. to 900° C., followed by cooling the spherical body such that a region between the surface and the first position has an austenite content of 10% to 25% by volume;

a tempering step of tempering the hardened spherical body at 150° C. or higher; and a shot peening step of subjecting the tempered spherical body to a shot peening treatment such that an entire region between the first position and the second position has a compressive residual stress of −1000 MPa or higher.

7. The manufacturing method according to claim 6, wherein the high-carbon chromium bearing steel comprises SUJ2 according to Japanese Industrial Standards.

* * * * *